United States Patent [19]
Dexter et al.

[11] 3,723,489
[45] Mar. 27, 1973

[54] METAL DERIVATIVES OF 3,5-DI-T-BUTYL-4-HYDROXYPHENYL PROPIONIC ACID

[75] Inventors: Martin Dexter, Briarcliff Manor; John D. Spivack, Spring Valley; David H. Steinberg, Bronx, all of N.Y.

[73] Assignee: Ciba-Geigy Corporation, Ardsley, N.Y.

[22] Filed: Feb. 25, 1971

[21] Appl. No.: 118,969

[52] U.S. Cl. ............... 260/429.7, 44/70, 99/63, 252/300, 260/45.85, 260/429, 260/429.9, 260/438.1, 260/448 R, 260/521 R
[51] Int. Cl. .............................................. C07f 7/22
[58] Field of Search .260/521 R, 473 S, 429.7, 429.9, 260/438.1, 448 R, 521 R

[56] References Cited

UNITED STATES PATENTS 3,121,732    2/1964    Meier et al. ............... 260/465 F
3,330,859    7/1967    Dexter et al. ............... 260/473 S

FOREIGN PATENTS OR APPLICATIONS 1,103,960    8/1960    Japan ............... 260/520

OTHER PUBLICATIONS

Imperial Chemical Ind., Chem. Abst. 54 23442e (1960).
Hoechst, ibid 71 31052p (1969).

Primary Examiner—Henry R. Jiles
Assistant Examiner—John F. Terapane
Attorney—Karl F. Jorda and Nestor W. Shust

[57] ABSTRACT

The preparation of metal salts of alkylhydroxyphenylpropionic acid is described. The metal salts are useful as stabilizers of organic materials which are subject to thermal, oxidative and actinic deterioration.

A typical embodiment is manganese 3(3',5'-di-t-butyl-4'-hydroxyphenyl)propionate.

4 Claims, No Drawings

METAL DERIVATIVES OF 3,5-DI-T-BUTYL-4-HYDROXYPHENYL PROPIONIC ACID

DETAILED DESCRIPTION

This invention relates to novel metal derivatives of 3,5-di-t-butyl-4-hydroxyphenylpropionic acids which are useful as stabilizers of organic materials which are subject to oxidative, thermal and actinic deterioration.

When the compounds of this invention are incorporated in an organic material, either along or in combination with other stabilizers or synergists, the organic material will be protected against oxidative, thermal and actinic deterioration.

The compounds of the present invention are represented by the following formula

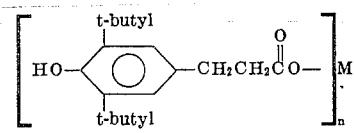

I wherein
M is a metal selected from the groups consisting of manganese, copper, zinc, lithium, tin, sodium, and aluminum, $n$ has a value of from 1 to 3, the value of $n$ being the same as the available valence M.

M is a metal cation selected from the groups consisting of lithium, sodium, copper, zinc, aluminum, tin, and manganese.

These compounds may be incorporated in the polymer substance during the usual processing operations, for example, by hot-milling, the composition then being extruded, pressed, roll-molded or the like into films, fibers, filaments, hollow-spheres and the like. The heat stabilizing properties of these compounds advantageously stabilize the polymer against degradation during such processing at the high temperatures generally encountered.

The metal derivatives of the alkylhydroxyphenypropionic acid of the present invention are useful as stabilizers of organic materials normally subject to oxidative and actinic deterioration. Such organic materials include: synthetic organic polymeric substances such as vinyl resins formed from the polymerization of vinyl halides or from the copolymerization of vinyl halides with unsaturated aldehydes and unsaturated hydrocarbons such as butadienes and styrene; poly-α-olefins such as polyethylene, polypropylene, polybutylene, polyisoprene, and the like, including copolymers of poly-olefins; polyurethanes and polyamides such as polyhexamethylene adipamide and polycaprolactam; polyesters such as polyethylene terephthalates; polycarbonates; polyacetals; polystyrene; polyethyleneoxide; and copolymers such as those of high impact polystyrene containing copolymers of butadiene and styrene and those formed by the copolymerization of acrylonitrile, butadiene and/or styrene.

Other materials which can be stabilized by the compounds of the present invention include lubricating oil of the aliphatic ester type, i.e., di(2-ethylene)-azelate, pentaerythritol tetracaptoate, and the like; animal and vegetable derived oils, e.g., linseed oil, fat, tallow, lard, peanut oil, code liver oil, castor oil, palm oil, corn oil, cottonseed oil, and the like; hydrocarbon materials such as gasoline, mineral oil, fuel oil, drying oil, cutting fluids, waxes, resins, and the like, salts of fatty acids such as soaps and the like.

It is an important aspect of this invention that not all the metal salts are equivalent in their effect to stabilize a specific substrate. Thus the manganese and copper salts are most effective in polyamides, the stannous salt in soaps and the lithium and sodium salts in rubber latex and the coagulated rubber derived therefrom.

In general, one or more of the stabilizers of the present invention are employed in amounts, in toto, of from about 0.005 to about 5 percent by weight of the composition to be stabilized. A particularly advantageous range of the present stabilizers is from about 0.05 percent to about 2 percent. The preferred range is particularly effective in polyolefins such as polypropylene.

The stabilizers employed in this invention can be also used in combination with other stabilizers or additives. Especially useful co-stabilizers are di-lauryl-beta-thiodipropionate and di-stearyl-beta-thiodipropionate.

The following formula represents co-stabilizers which are in certain instances very useful in combination with the stabilizers of this invention:

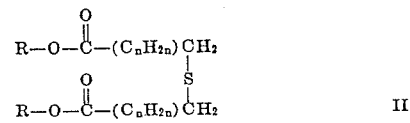

II wherein R is an alkyl group having from six to 24 carbon atoms; and n is an integer from 1 to 6. The above co-stabilizers are used in the amount of from 0.01 to 2 percent by weight of the organic material, and preferably from 0.1 to 1 percent.

Other antioxidants, antiozonants, thermal stabilizers, ultraviolet light absorbers, coloring materials, dyes, pigments, metal chelating agents, etc., may also be used in the compositions in combination with the stabilizers of the invention.

The compounds of the present invention per se, can be prepared by treating 3,5-di-t-butyl-4-hydroxyphenylpropionic acid wich a reactive form of the metal or metal complex, e.g., sodium hydroxide, lithium hydroxide, potassium hydroxide or the like. Alternatively, and preferably in the case of metal complexes and metals other than the alkali metals, a double decomposition is employed. Thus, for example, a sodium salt of the present invention is treated with nickel chloride. In a similar fashion use of other halides such as aluminum chloride, barium chloride and the like results in formation of the corresponding metal derivative.

The lower alkyl esters of this alkylhydroxyphenylpropionic acid, prepared by the reaction of alkali metal salts of an alkylated phenol with methyl acrylate or with esters of -haloalkanoic acids can be hydrolyzed with a strong base, such as sodium hydroxide, to yield the sodium salt of the corresponding acid. The sodium salt can be converted to the free acid by conventional procedures, that is, by acidification with a mineral acid, or can be used directly to prepare other metal derivatives as mentioned previously.

The following examples are presented to further illustrate, and not limit, the nature and scope of the present invention.

EXAMPLE I

Zinc bis [3-(3',5'-di-t-butyl-4'-hydroxyphenyl)propionate]

To a solution of 16.73 parts of 3-(3',5'-di-t-butyl-4'-hydroxyphenyl)propionic acid in 100 parts by volume of ethanol, was added with continuous stirring at room temperature, a solution containing 2.45 parts of sodium hydroxide in 100 parts by volume of ethanol. After stirring briefly, the above solution was treated with a solution of 4.31 parts of zinc chloride in 150 parts of volume of ethanol. Stirring was continued at room temperature for approximately 16 hrs. after which the reaction mixture was filtered. Removal of the ethanol left 19.3 parts of crude product having M.P. 218°–20° C (dec. 230°–240° C). Purification was achieved by selective extraction of the product into benzene. Removal of the solvent left 17.2 parts of product melting at 216°–20° C.

Anal. Cal'cd for $C_{34}H_{50}ZnO_6$: C, 65.84; H, 8.12; Zn, 10.54
Found : C, 66.08; H, 8.12; Zn, 10.02.

EXAMPLE 2

Stannous bis[3-(3',5'-di-t-butyl-4'-hydroxyphenyl)propionate]

By following the procedure of Example 1 and substituting stannous chloride for zinc chloride, the above-named product was obtained, M.P. 145°–150°C.

This compound is especially useful as a stabilizer for soap compositions.

EXAMPLE 3

Lithium 3-(3',5'-di-t-butyl-4'-hydroxyphenyl)propionate

A solution consisting of 13.92 parts of 3-(3',5'-di-t-butyl-4'-hydroxyphenyl)propionic acid in 100 parts by volume of ethanol was treated with a solution obtained by dissolving 0.441 parts of lithium hydroxide in 100 parts by volume of ethanol. Removal of the solvent and drying the residue at 50° C/0.1mm afforded 12.4 parts of the above-named product having M.P. of 350° C.

This compound is especially useful for the stabilization of rubber and can be formulated into the rubber by addition to the rubber latex.

EXAMPLE 4

Sodium 3-(3',5'-di-t-butyl-4-hydroxyphenyl)propionate

A solution consisting of 5 parts by weight of 3-(3',5'-di-t-butyl-4'-hydroxyphenyl)propionic acid in 80 parts by volume of methyl alcohol was treated with a solution obtained by dissolving 8 parts by weight of sodium hydroxide in about 20 parts by volumn of methyl alcohol. The methyl alcohol was removed. The product was dissolved in a benzene ethanol solution and the solution was concentrated under vacuun till incipient crystallization at which time hexane was added. The product was filtered and dried and had an M.P. >300° C.

This compound is especially effective in the stabilization of rubber latex and the coagulated rubber derived therefrom.

EXAMPLE 5

Copper 3-(3',5'-di-t-butyl-4'-hydroxyphenyl)propionate

To a solution of 9.01 parts sodium 3-(3',5'-di-t-butyl-4'-hydroxyphenyl)propionate in 380 ml of water was added with stirring at room temperature, a solution containing 6.29 parts of copper sulfate pentahydrate in 150 ml of water. The product which precipitated out was filtered and washed with water and dried. After drying 14.9 parts (96.5 percent) of the product was obtained.

Anal. Cal'cd for Cu: 10.28%
Found : 10.1

This compound is especially effective in stabilizing polyamide compositions, particularly polyamides, e.g., Nylon 66 when used alone with an iodide salt.

EXAMPLE 6

Manganese 3-(3',5'-di-t-butyl-4-hydroxyphenyl)propionate

By following the same procedure of Example 5 and substituting 4.95 parts of manganese chloride tetrahydrate for copper sulfate, the above named product was obtained in 73.5 percent yield.

Anal. Cal'cd for Mn: 9.01
Found: 8.89

This compound is especially effective as a light stabilizer for Nylon 66 and other polyamides.

EXAMPLE 7

Aluminum tris [3-(3',5'-di-t-butyl-4'-hydroxyphenyl)propionate]

The procedure followed is essentially that of Gilmour et al. (J. Chem. Soc., 1956, 1972) as described for the preparation of aluminum tristearate.

By reacting 8.35 g (0.03 moles) of 3-(3',5'-di-t-butyl-4'-hydroxyphenyl)propionic acid with 2.04 g (0.01 moles) of aluminum isopropoxide in 100 ml of dry pyridine according to the above-reference method, there is obtained, after thorough drying, 8.6 g of aluminum tris [3-(3',5'-di-t-butyl-4'-hydroxyphenyl)propionate].

Alternatively, other known methods for preparing aluminum salts of carboxylic acids can also be used such as reaction of alum with alkyl esters of 2,5-di-t-butyl-4-hydroxyphenylpropionic acid.

This compound is especially effective in the stabilization of polypropylene.

EXAMPLE 8

Various metal salts of this invention were milled at 182° C into polypropylene at 0.5 percent by weight concentration. Also milled into the polypropylene with the metal salt was 0.5 percent dilaurylthiodipropionate. Plaques of 25 ml thickness were molded at 218° C and exposed to oven aging at 300° F and the time in hours to embrittlement of these samples are indicated below.

| Compound | Hrs. To Embrittlement |
| --- | --- |
| lithium 3-(3',5'-di-t-butyl-4-hydroxy-phenyl)propionate | 295 |
| stannous bis[3-(3',5'-di-t-butyl-4-hydroxyphenyl)propionate] | 315 |
| sodium 3-(3',5'-di-t-butyl-4-hydroxy-phenyl)propionate | 350 |

Polypropylene containing no stabilizer failed after 3 hours and polypropylene containing onyl dilaurylthiodipropionate failed after 180 hours.

EXAMPLE 9

A composition is prepared comprising linear polyethylene and 1.0 percent by weight of zinc 3-(3',5'-di-t-butyl-4-hydroxyphenyl)propionate. The composition is injected molded into tensile bars which are placed in a circulating air oven at 120° C. In contrast to those molded from unstabilized linear polyethylene, tensile bars molded from the instant composition retained its tensile strength for a substantially longer period.

EXAMPLE 10

A composition comprising an acrylonitrile butadiene-styrene terpolymer and 0.1 percent stannous [3-(3,5-di-t-butyl-4-hydroxyphenyl)propionate] resists discoloration at 120° C longer than one which does not contain the stabilizer.

EXAMPLE 11

Pellets (500 g) of unstabilized nylon-6,6 (Zytel 101, DuPont) are placed in a mixer. With mixing, 2.5 g (0.5 percent) of copper 3-(3,5-di-t-butyl-4-hydroxyphenyl)propionate and 0.7848 gm of potassium iodide dissolved in 35 cc of isopropanol is added slowly with mixing to the nylon pellets. The stabilized pellets are dried at 80° C at <1 mm for 4 hours.

The polyamide formulation is extruded at 600° F through a ¼ inch die into a rod which is water-cooled and chopped into pellets. A ¾ inch Brabender extruder equipped with a nylon screw is used and the pellets are dried at 80° C at <1 mm for 4 hours.

The dried pellets are pressed into 5 × 5 × 0.005 inch films at 290° C and 350 psi for 3 minutes in a four-cavity window frame mold. The mold is transferred quickly to a water-cooled press and maintained at 350 psi, for 2–3 minutes.

Samples (2.2 g) of compression molded nylon-6,6 films are aged in an air circulating, rotary oven at 150° C.

Stabilizer performance is assessed by measurements of specific viscosity retention of oven aged samples in 11 percent formic acid solution.

The stabilized polyamide composition has better viscosity retention after aging compared to an unstabilized polyamide.

A stabilized polyamide composition is prepared in a similar manner as above with the following metal salt:

a. 0.5 percent of manganese 3-(3',5'-di-t-butyl-4-hydroxyphenyl)propionate.

The stabilized composition when exposed in a Fadeometer to the light emitted by a carbon arc is substantially more stable than an unstabilized composition.

EXAMPLE 12

Various metal salts of this invention were milled into polypropylene at 182° C at a concentration of 0.5 percent by weight. Also milled into the polypropylene with the metal salt was 0.5 percent dilaurylthiodipropionate. Plaques of 25 ml thickness were molded at 218° C and exposed in a Fadeometer to the light emitted by a carbon arc and the time in hours to embrittlement is given below:

| Compound | Hrs. to Embrittlement |
| --- | --- |
| zinc 3-(3',5'-di-t-butyl-4-hydroxy-phenyl)propionate | 120 |
| stannous bis[3-(3',5'-di-t-butyl-4-hydroxyphenyl)propionate] | 300 |
| sodium 3-(3',5'-di-t-butyl-4-hydroxy-phenyl)propionate | 180 |

Polypropylene containing no stabilizer and polypropylene containing only dilaurylthiodipropionate failed in less than 65 hours.

EXAMPLE 13

A stabilized soap composition is prepared by milling on a three-roll mill at room temperature 5 mg (0.05 percent) of stannous bis[3-(3',5'-di-t-butyl-4-hydroxyphenyl)propionate] in 10 gms of potassium stearate.

EXAMPLE 14

A quantity of SBR emulsion containing 100 grams of rubber (500 ml of 20% SBR obtained from U.S. Texas, Synpol 1500) previously stored under nitrogen, is placed in a beaker and stirred vigorously. The pH of the emulsion is adjusted to 10.5 with a 0.5N NaOH solution.

To the emulsion is added 50 ml of 25% NaCl solution. A 6% NaCl solution of pH 1.5 is added in a thin stream with vigorous stirring. When pH 6.5 is reached, the rubber begins to coagulate and the addition is slowed down in order to maintain uniform agitation. The addition of the acidic 6% NaCl solution is terminated when a pH 3.5 is reached. The coagulated crumb-rubber slurry at pH 3.5 is stirred for one-half hour.

The coagulated rubber is isolated by filtration through cheese cloth, and rinsed with distilled water. After three subsequent washing with fresh distilled water, the coagulated rubber is dried, first at 25 mm Hg and finally to constant weight under high vacuum at 40°–45 C.

The dried rubber (25 gms) is heated under nitrogen at 125° C in a Brabender mixer and to this is added with mixing 1.25 gm(0.5 percent) of sodium 3-(3',5'-di-t-butyl-4-hydroxyphenyl)-propionate. The composition is mixed for 5 minutes after which it is cooled and compression molded at 125° C into 5 × 5 × 0.025 inch plaques.

The plaques are placed on aluminum sheets and heated in a circulating air oven at 100° C for up to 96 hours. The viscosity of a 0.5 percent toluene solution of aged and unaged rubber samples are determined at 25° C. Stabilizer effectiveness is judged by the percent retention of specific viscosity, color formation and gel content after over aging. The stabilized rubber has better viscosity, color retention and less gel content than the rubber which is unstabilized after oven aging.

What is claimed is:

1. A compound of the formula

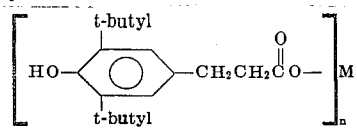

wherein
M is a metal selected from the group consisting of aluminum, copper, and tin;
$n$ has a value of from 1 to 3, the value of $n$ being the same as the available valence of M.

2. A compound according to claim 1 wherein M is copper.

3. A compound according to claim 1 wherein M is tin.

4. A compound according to claim 1 wherein M is aluminum.

* * * * *